United States Patent [19]

Rosen

[11] Patent Number: 4,510,092
[45] Date of Patent: * Apr. 9, 1985

[54] CONTINUOUS REDUCTION OF EDIBLE OILS

[75] Inventor: Bruce I. Rosen, Skokie, Ill.

[73] Assignee: UOP Inc., Des Plaines, Ill.

[*] Notice: The portion of the term of this patent subsequent to May 24, 2000 has been disclaimed.

[21] Appl. No.: 360,114

[22] Filed: Mar. 19, 1982

[51] Int. Cl.³ .................................................. C11C 3/12
[52] U.S. Cl. ...................................... 260/409; 502/335
[58] Field of Search ............. 260/409; 252/472, 466 J, 252/461, 459; 502/335

[56] References Cited

U.S. PATENT DOCUMENTS

| | | | |
|---|---|---|---|
| 2,948,742 | 8/1960 | Zajcew | 260/409 |
| 2,971,016 | 2/1961 | Szabo | 260/409 |
| 3,123,626 | 3/1964 | Kirsch | 260/409 |
| 3,123,627 | 3/1964 | Flank et al. | 260/409 |
| 3,444,221 | 5/1969 | Voeste | 260/409 |
| 3,634,471 | 1/1972 | Kehse | 260/409 |
| 3,792,067 | 2/1974 | Coombes et al. | 260/409 |
| 3,823,172 | 7/1974 | Leuteritz | 260/409 |
| 3,988,329 | 10/1976 | Zucker et al. | 260/409 |
| 4,118,342 | 10/1978 | Debus et al. | 252/439 |
| 4,163,750 | 8/1979 | Bird et al. | 260/409 |
| 4,385,001 | 5/1983 | Rosen | 252/472 |
| 4,424,162 | 1/1984 | Rosen | 260/409 |
| 4,424,163 | 1/1984 | Rosen | 260/409 |

*Primary Examiner*—Thomas A. Waltz
*Attorney, Agent, or Firm*—James R. Hoatson, Jr.; Eugene I. Snyder; William H. Page, II

[57] ABSTRACT

A method of continuously hydrogenating fatty materials over a fixed catalyst bed utilizes zerovalent nickel on alpha-alumina. Partial hydrogenation of soybean oil to an IV of about 110 can be successfully performed using alpha-alumina of surface area less than about 5 m²/g to afford a product whose SFI is acceptable for end product use.

11 Claims, No Drawings

CONTINUOUS REDUCTION OF EDIBLE OILS

BACKGROUND OF THE INVENTION

Although some edible oils are used per se, by far the largest portion is hydrogenated, or hardened, prior to end use to increase the stability of the final product. For example, processed soybean oil is susceptible to oxidation resulting in deterioration of its organoleptic properties upon storage even at ambient temperature. Where the oil is to be used at higher temperatures, for example, as a frying oil, the adverse organoleptic consequences of oxidation become even more pronounced.

The commonly accepted origin of oxidative deterioration is the presence of highly unsaturated components, such as the triene moiety, linolenate, in soybean oil. Partial hydrogenation to remove most of this component leads to a marked increase in the oxidative stability of the resulting product, thereby facilitating storage and permitting unobjectionable use at higher temperatures. Ideally, one desires this hydrogenation to be highly specific, reducing only triene to the diene, linoleate, without effecting cis to trans isomerization. In practice, this goal is unachievable.

The fats and oils which are the subject of this invention, hereinafter collectively referred to as fatty materials, are triglycerides of fatty acids, some of which are saturated and some of which are unsaturated. In vegetable oils, the major saturated fatty acids are lauric (12:0), myristic (14:0), palmitic (16:0), stearic (18:0), arachidic (20:0), and behenic (22:0) acids. The notation, "18:0," for example, means an unbranched fatty acid containing 18 carbon atoms and 0 double-bonds. The major unsaturated fatty acids of vegetable oils may be classified as monounsaturated, chief of which are oleic (18:1) and erucic (22:1) acids, and polyunsaturated, chief of which are the diene, linoleic acid (18:2), and the triene, linolenic acid (18:3). Unhardened vegetable fats and oils contain virtually exclusively cis-unsaturated acids.

In the context of partial hydrogenation, the ultimate goal is the reduction of triene to diene without attendant trans-acid formation or saturate formation. In practice, it is observed that partial reduction results in lowering both triene and diene and increasing the monoene, saturate, and trans levels. Because it is desired that the product of partial hydrogenation itself be a liquid oil relatively free of sediment or even cloudiness upon storage at, for example, 10° C., the formation of saturated and trans acids in such hydrogenation is a vexing problem. Removal of these solids, whose relative amount is measured by the Solid Fat Index (SFI), is a relatively costly and inefficient process attended by large losses associated with the separation of gelatinous solids from a viscous liquid. It is known in the art that such solids are composed largely of triglycerides containing at least one saturated fatty acid moiety and/or trans monounsaturated fatty acid moieties with the predominant culprits having at least 18 carbon atoms. It is further known in the art that fatty acid analysis alone may be an insensitive analytical tool, that is to say, two products of hydrogenation of, for example, soybean oil may show different SFI profiles while having virtually identical fatty acid analysis. This arises because the distribution of the saturated moieties in the triglyceride is important. The solubility in the soybean oil of disaturated triglycerides is much less than twice the solubility of monosaturated triglycerides, and the solubility of monosaturated triglycerides may depend upon whether the other fatty acid moieties of the triglyceride are monounsaturated, diunsaturated, etc., and may also depend upon whether the saturated, portion is at the one- or two-position of the triglyceride. Hence, hydrogenation of fatty materials is largely an empirical process, whose analytical tools include SFI supported by fatty acid analysis. The difficulty of achieving desirable results, especially in the context of selectivity in Solid Fat Index, has largely limited such hydrogenation to a batch type process. Although the transition from a batch to a continuous process, especially of the fixed bed type, is conceptually facile, it will be recognized by the skilled worker that impediments have been substantial.

Thus, U.S. Pat. No. 2,971,016 describes the vapor-phase hydrogenation of unsaturated fatty acids and esters in a fluidized bed, which enabled the disadvantages of liquid phase hydrogenation and the use of solid bed catalysts to be avoided. It will be recognized that vapor-phase hydrogenation is unfeasible for oils and fats. A continuous process based on a mixture of oil and suspended catalyst flowing along a tortuous path on the top surface of a series of perforated plates, with hydrogen admitted through the bottom face counter-current to the oil flow and minimum mixing along the various plates, is the subject of U.S. Pat. No. 3,634,471. The process described in U.S. Pat. No. 3,792,067, which has had limited commercial application, is based on a turbulent two-phase gas-liquid flow with minimal backmixing, the liquid phase consisting of oil containing catalyst suspended therein. Both U.S. Pat. Nos. 3,823,172 and 3,988,329 describe continuous hydrogenation processes where the flowing mass of oil containing suspended catalyst is subject to high shear forces. U.S. Pat. No. 3,444,221 describes a continuous process which requires a high ratio of liquid (catalyst suspended in oil) to gas phase using a plurality of reaction chambers.

The processes represented in the latter four references all suffer from the common disadvantage of necessitating the additional unit process of removal of suspended catalyst from partially hydrogenated oil, as by filtration. It is well known in the art that this unit process entails substantial product loss and requires use of relatively large amounts of filter aid, which adds to processing cost and presents subsequent disposal problems. Because use of a fixed bed continuous operation obviates the necessity of catalyst removal, such a mode of operation is greatly preferred. Both U.S. Pat. Nos. 3,123,626 and 3,123,627 describe fixed bed processes using sulfur- or nitrogen-poisoned nickel, respectively, on a macroporous silica support. At least in part, success of the method is attributable to the large pore structure of the support with catalyst contained within the pores. A diametrically opposed approach to fixed bed hydrogenation is described in U.S. Pat. No. 4,163,750, where metals, including nickel, are deposited almost entirely on the outer surfaces of the particles of the support. The support itself may be porous, and in fact advantages are ascribed to porous supports, such as porous carbon, as compared with non-porous supports, as stainless steel. The method of achieving surface deposition of the metal, which appears to be critical to the success of this process, does not seem to be disclosed.

The observation upon which the subject invention of this application is founded is that alpha-alumina of low surface area and low porosity functions as an effective support for catalytically active zerovalent nickel in the fixed bed hydrogenation of fatty materials, affording partially hydrogenated product with the desired selectivity. This observation seems unknown in the prior art, and stands in sharp constrast to the prior art requirements of a high surface area, porous support.

It is an object of this invention to provide a method of selective hydrogenation of fatty materials by a continuous process. An embodiment comprises hydrogenating a vegetable oil over a fixed bed of a hydrogenation catalyst consisting essentially of catalytically active zerovalent nickel impregnated on alpha-alumina whose surface area is less than about 10 m$^2$/g and micropore volume is less than about 0.1 ml/g. In a more specific embodiment, the alumina has a surface area less than about 5 square meters per gram. In a still more specific embodiment, the nickel is present at a level from about 1 to about 25% based on alpha-alumina.

DESCRIPTION OF THE INVENTION

The subject matter disclosed is a method of hydrogenating fatty materials comprising contacting a flowing mass of a fatty material with a fixed bed of catalyst consisting essentially of catalytically active zerovalent nickel on alpha-alumina whose surface area is less than about 10 m$^2$/g and whose micropore volume is less than about 0.1 ml/g at a temperature from about 150° to about 250° C. in the presence of hydrogen at a pressure up to about 150 psig, and recovering the resulting hydrogenated product.

The method described herein is generally applicable to fatty materials and is especially applicable to edible oils and fats. Because the partial hydrogenation of liquid oils to afford hardened, but still liquid, oils occupies a prominent part within the domain of hydrogenation of edible oils and fats, the method of this invention is particularly applicable to such partial hydrogenation. Thus the described method of hydrogenation is especially useful to partially harden edible liquid oils whereby the iodine value (IV) is lowered from about 10 to about 30 units by hydrogenation, whereby the increase in saturates attending hydrogenation is less than about 1.5%, and whereby the triene level is reduced to about 3% or less. Such a partially hydrogenated product preferably has an SFI of less than about 5±1 at 50° F., less than about 2±0.5 at about 70° F., less than about 1.0±0.5 at 80° F., and 0+0.2 at 92° F. The term "iodine value" is a measure of the total extent of unsaturation in an edible oil or fat as performed by a standard test. In the context of soybean oil, which is a particularly important liquid vegetable oil, partial hardening is continued to an IV drop of from about 15 to about 25 units, with the product having less than about 6% stearate and about 3% linolenate or less.

The method of this invention is especially applicable to liquid vegetable oils. Examples of such oils include soybean oil, cottonseed oil, sunflower oil, safflower oil, rapeseed oil, corn oil, and liquid fractions from palm oil. The application of this method to soybean oil is especially important. As will be recognized by those skilled in the art, partial hydrogenation of liquid oils to afford partially hardened liquid oils is especially demanding, hence it is to be expected that a method suitable for this task also is suitable for more extensive hydrogenation. Thus, the method described herein also is suitable for more extensive hydrogenation, where the IV of the product may be as low as about 70. Oils and fats which can be so hydrogenated include those above, their partially hydrogenated products, and also such feedstocks as palm oil.

The hydrogenation catalyst used in this method is essentially catalytically active zerovalent nickel deposited on alpha-alumina. It is to be understood that by alpha-alumina is meant alumina whose crystallinity as measured by X-ray diffraction corresponds to that characterized in ASTM file number 10-173. Although zerovalent nickel is widely used in this art area, it is generally used on supports, such as kieselguhr and alumina, of high surface area and large porosity. A discovery of this invention is that continuous hydrogenation using zerovalent nickel in a fixed bed mode can be successfully performed, in the context of the criteria elaborated above, only on supports characterized by relatively low surface area and porosity. In particular, the hydrogenation catalyst of this method consists essentially of catalytically active zerovalent nickel on alpha-alumina with a surface area less than about 10 m$^2$ per gram, with a surface area less than about 5 m$^2$ per gram preferred. Additionally, the micropore volume of the support must be less than about 0.1 ml/g, with those supports having a micropore volume less than about 0.05 ml/g, being advantageous. The macropore volume of the supports used in this invention is related to the surface area of the support. Consequently the supports used herein are further characterized by a macropore volume less than about 0.6 ml/g, with a macropore volume under about 0.3 ml/g being preferred. By micropore volume is meant the total volume of pores under about 117 angstroms in size; by macropore volume is meant the total volume of pores greater than about 117 angstroms in size.

It is believed that, because of transport problems associated with fatty materials in the smaller pores, the selectivity in hydrogenation of a catalyst of a given surface area, micro- and macropore volume will change with macropore distribution. In particular, it is believed that a distribution skewed toward relatively large pore sizes will favor selectivity. As an example, with other variables being held constant it is believed that a catalyst whose support contains 90% of its macropores larger than about 3500 angstroms will be more selective than one where 90% of the macropores are larger than 300 angstroms, but only 10% larger than 3500 angstroms.

It will be recognized that such a catalyst as described above represents a radical departure from those of the prior art, and it is to be emphasized that such a departure is a prerequisite for a successful method of continuous hydrogenation using a fixed bed.

The concentration of nickel may range from 1 to about 25 percent by weight of alumina. The choice of nickel loading will depend, inter alia, on the degree of selectivity and catalyst life desired in a particular operation.

Hydrogenations are conducted at a temperature from about 150° to about 250° C., with the range of 175° to 225° C. being preferred. Hydrogenations may be conducted at pressures up to about 150 psig, although there is some advantage to conducting such hydrogenations at a pressure from about 5 to about 50 psig.

The following description is applicable to a fixed bed operation, although it will be recognized that by suitable changes it may also be applicable to expanded or fluidized bed operation. The catalyst bed may be in the form of pellets, granules, spheres, extrudate, and so forth. The reactor is heated to the desired reaction temperature in a hydrogen atmosphere, often with a small hydrogen flow. After attainment of the desired temperature, the feedstock of fatty material is made to flow over the fixed bed. The flow may be either downflow, as in a trickle bed operation, or upflow, as in a flooded bed operation. The flow rate of the oil may be from about 1 to about 20 LHSV. When the flow of fatty material is initiated, it is desirable to mix the hydrogen with the feedstock so as to maintain the desired pressure. Often it is advantageous to admit excess hydrogen, maintaining pressure by partial venting. As the reaction proceeds and the activity of the catalyst bed decreases, adjustments may be made either in the LHSV or the temperature to maintain the desired characteristics of the product. The product, such as a partially hardened oil, is recovered as the effluent in a state suitable for further processing, such as blending, bleaching, or deodorization.

The examples herein are cited for illustrative purposes only and are not to be construed as limiting this invention in any way.

EXAMPLES 1-7

All hydrogenations were conducted in a reactor of conventional design containing a fixed bed of about 50 ml catalyst. The reactor had a preheater section for bringing feedstock to temperature and a heater for the reaction zone. The feedstock, which was soybean oil in these samples, was passed upflow by a metering pump and mixed with hydrogen before the preheater stage. In all cases there was a net excess of hydrogen, that is, hydrogen in excess of that necessary for reaction was introduced into the reaction zone and excess hydrogen was vented so as to maintain a constant pressure.

Iodine values were calculated from the measured fatty acid distribution. Solid fat index was determined by AOCS method CD10-57. Fatty acid distribution was determined by AOCS method CE2-66. Macropore volume was determined by the mercury intrusion method as described in ANSI/ASTM D 2873-10 using the porosimeter of U.S. Pat. No. 3,158,020.

Catalyst C was prepared by flowing a 1.4M solution of nickel nitrate through a column of 1/16-inch spheres of alpha-alumina, separating the spheres and calcining them at 460° C., first in air for $2\frac{1}{3}$ hours, then in hydrogen for 3 hours. Catalysts D-G were prepared by mixing the alumina with an aqueous solution of nickel nitrate hexahydrate, evaporating the water under reduced pressure while mixing, and calcining the resulting solid at 450° C. in air for 3-4 hours and in hydrogen for 2-4 hours.

The various catalysts used are described in Table 1 with pore distributions of some of the supports listed in Table 2. Catalysts A and B had a common support as did catalysts C and D.

Results of some typical hydrogenations are given in Table 3, with the SFI of the products listed in Table 4.

TABLE 1

Catalyst Compositions

| Catalyst | Description | Surface Area ($m^2/g$) | Pore Volume, ml/g micropore | Pore Volume, ml/g macropore |
|---|---|---|---|---|
| A | Commercial catalyst (H-4, UOP, Inc.), 25% nickel on gamma-alumina, 12-20 mesh. | 200 | 0.5 | 0.3 |
| B | Commercial catalyst (H-4, UOP, Inc.), 25% nickel on gamma-alumina, 20-40 mesh. | 200 | 0.5 | 0.3 |
| C | 1.5% nickel on alpha-alumina, 1/16-inch spheres. | 3 | 0.03 | 0.2 |
| D | 5% nickel on alpha-alumina, 1/16-inch spheres. | 3 | 0.03 | 0.2 |
| E | 5% nickel on alpha-alumina 1/16-inch spheres. | 13 | 0.03 | 0.45 |
| F | 25% nickel on gamma-alumina, 1/16-inch spheres. | 160 | 0.37 | 1.4 |
| G | 5% nickel on alpha-alumina, $\frac{1}{8} \times \frac{1}{8}$-inch rods. | 3 | 0.1 | 0.26 |

TABLE 2

Macropore Distribution of Supports

| Pore size (angstroms) | C(D) | E | F |
|---|---|---|---|
| 117-300 | 0.0000 | 0.037 | 0.2662 |
| 300-500 | 0.0000 | 0.018 | 0.6094 |
| 500-1000 | 0.0003 | 0.018 | 0.4488 |
| 1000-1750 | 0.0000 | 0.370 | 0.0318 |
| 1750-3500 | 0.0000 | 0.000 | 0.0155 |
| 3500-17,500 | 0.2037 | 0.005 | 0.0054 |
| 17,500-58,333 | 0.0000 | 0.000 | 0.0023 |

TABLE 3

Continuous Hydrogenation of Soybean Oil

| Example | Catalyst none | T(°C.) | Pressure (psig) | LHSV | H₂ Flow (ft³/h) | IV | 18:3 7.4 | 18:2 54.2 | 18:1 23.6 | 18:0 4.5 |
|---|---|---|---|---|---|---|---|---|---|---|
| 1 | A | 215 | 50 | 5 | .41 | 113 | 3.9 | 40.8 | 37.6 | 7.1 |
| 2 | B | 195 | 50 | 8 | .82 | 109 | 4.2 | 38.6 | 36.6 | 10.4 |
| 3 | C | 223 | 100 | 3.5 | .41 | 112 | 2.8 | 39.5 | 40.9 | 6.1 |
| 4 | D | 195 | 50 | 3.5 | .41 | 109 | 2.8 | 36.7 | 44.3 | 5.6 |
|   |   | 202 | 50 | 3.0 |   | 113 | 2.3 | 41.8 | 39.9 | 5.4 |
|   |   | 200 | 25 | 3.0 |   | 116 | 3.1 | 43.8 | 37.6 | 4.9 |
| 5 | E | 175 | 50 | 2.8 | .41 | 108 | 3.3 | 35.9 | 43.5 | 6.9 |
|   |   | 198 | 50 | 5.8 |   | 114 | 4.3 | 40.4 | 38.4 | 5.9 |
| 6 | F | 220 | 50 | 8 | .41 | 110 | 3.6 | 38.0 | 41.5 | 6.4 |

Fatty Acid Distribution, %

TABLE 3-continued

Continuous Hydrogenation of Soybean Oil

| Example | Catalyst none | T(°C.) | Pressure (psig) | LHSV | H₂ Flow (ft³/h) | IV | Fatty Acid Distribution, % 18:3 | 18:2 | 18:1 | 18:0 |
| --- | --- | --- | --- | --- | --- | --- | --- | --- | --- | --- |
|  |  |  |  |  |  |  | 7.4 | 54.2 | 23.6 | 4.5 |
| 7 | G | 200 | 50 | 3.0 |  | 113 | 3.2 | 39.7 | 41.2 | 5.2 |

TABLE 4

Solid Fat Index of Hydrogenation Products

| | Catalyst Used | | | | | | |
| --- | --- | --- | --- | --- | --- | --- | --- |
| | A | B | C | D | E | F | G |
| SFI: 50° F. | 7.2 | 6.7 | 5.7 | 4.5 | 7.5 | 5.1 | 3.3 |
| 70° F. | 5.6 | 5.4 | 2.1 | 1.7 | 4.2 | 2.5 | 0.8 |
| 80° F. | 5.4 | 5.1 | 1.0 | 0.6 | 3.4 | 1.7 | 0.1 |
| 92° F. | 4.6 | 4.3 | 0 | 0 | 2.3 | 1.0 | 0 |
| 104° F. | 2.9 | 2.8 | 0 | 0 | 1.5 | .4 | 0 |
| IV | 113 | 114 | 112 | 108 | 107 | 110 | 113 |

Tables 3 and 4 lead to the following conclusions. Nickel on alpha-alumina is substantially more selective than commercial catalysts of nickel on gamma-alumina, a high surface area, high porosity support; cf. examples 1, 2, and 6 with 3, 4, and 7. None of the catalysts on gamma-alumina lead to selective hydrogenation as defined herein. For example, catalyst F affords a product with 6.4% stearate at a triene level of 3.6%. A catalyst on alpha-alumina whose surface area is over 10 m²/g is also insufficiently selective; see example 5 which shows that attainment of a triene level near the target of about 3% is accompanied by a stearate level of almost 7%, and attainment of a stearate level near the target of 6% is accompanied by a high triene level of over 4%. Finally, catalysts C, D, and G are the only ones capable of meeting the stringent selectivity requirements in partial hydrogenation.

The conclusions above are supported more dramatically by the SFI data of Table 4. Only catalysts C, D, and G afford products which have the desired profile of solids content. Although the gamma-alumina supported catalyst in F has desirably low solids at 50° and 70° F., zero solid content is not attained even at 104° F.

What is claimed is:

1. A method of selectively hydrogenating fatty materials continuously comprising contacting a flowing mass of a fatty material with a fixed mass of catalyst, consisting essentially of catalytically active zerovalent nickel on alpha-alumina having a surface area less than about 10 m²/g and a micropore volume less than about 0.1 ml/g, at a temperature from about 150° to 250° C. in the presence of hydrogen at a pressure up to about 150 psig, and recovering the resulting hydrogenated product.

2. The method of claim 1 wherein said fatty material is a liquid vegetable oil.

3. The method of claim 2 wherein said liquid vegetable oil is selected from the group consisting of soybean oil, cottonseed oil, rapeseed oil, sunflower oil, corn oil, safflower oil, and liquid fractions from palm oil.

4. The method of claim 3 wherein said oil is soybean oil and contacting is of a duration sufficient to lower its iodine value from about 10 to about 30 units.

5. The method of claim 1 wherein the catalyst contains from about 1 to about 25% nickel.

6. The method of claim 1 wherein the surface area is less than about 5 m²/g.

7. The method of claim 1 wherein the micropore volume is less than about 0.05 ml/g.

8. The method of claim 1 wherein the alpha-alumina is further characterized by a macropore volume less than about 0.6 ml/g.

9. The method of claim 8 wherein said macropore volume is less than about 0.3 ml/g.

10. The method of claim 1 wherein the temperature is from about 175° to about 225° C.

11. The method of claim 1 wherein the hydrogen pressure is from about 5 to about 50 psig.

* * * * *